(12) United States Patent
Crawford et al.

(10) Patent No.: US 8,150,476 B2
(45) Date of Patent: Apr. 3, 2012

(54) BATTERY INTERFACE ASSEMBLY FOR A COMMUNICATION DEVICE

(75) Inventors: Christopher D. Crawford, Hollywood, FL (US); Jorge L. Garcia, Plantation, FL (US); Mark C. Taraboulos, Dunwoody, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 1055 days.

(21) Appl. No.: 12/040,288

(22) Filed: Feb. 29, 2008

(65) Prior Publication Data
US 2009/0221331 A1 Sep. 3, 2009

(51) Int. Cl.
*H04B 1/38* (2006.01)
*H04M 1/00* (2006.01)

(52) U.S. Cl. .................... 455/572; 455/575.1; 455/550.1

(58) Field of Classification Search .................. 455/572, 455/574, 575.1, 575.4, 575.8, 550.1, 90.1–90.3
See application file for complete search history.

(56) References Cited

U.S. PATENT DOCUMENTS 5,203,022 A   4/1993   Finch et al.

OTHER PUBLICATIONS

PCT/US2009/025203—EPC International Search Report mailed Jul. 2, 2009—13 pages.

*Primary Examiner* — Eugene Yun
(74) *Attorney, Agent, or Firm* — Barbara R. Doutre (57) ABSTRACT

A battery interface assembly for a communication device (100), such as a portable radio, is provided to ensure a reliable interconnection between battery contacts (230) and radio contacts (108). Communication device (100) includes a casting (110) having a cavity (112) with two apertures formed therein (114, 228). The two apertures (114, 228) open into the cavity (112) to provide a point of contact for mating radio contacts (108) to the battery contacts (230). The battery contacts (230) are wiping contacts which mate with the radio contacts (108) as the battery is slid into the casting (110). A compression seal (126) is provided to the radio contacts (108) while a radial seal (120) is provided about the battery contacts (230) to ensure reliable electrical and physical connection under a variety of environments.

25 Claims, 8 Drawing Sheets

BATTERY INTERFACE ASSEMBLY FOR A COMMUNICATION DEVICE

FIELD OF THE DISCLOSURE

The present disclosure relates generally to battery interfaces and more particularly to a battery interface assembly for a communication device.

BACKGROUND

With the increased functionality of mobile communication devices, particularly in the area of battery powered portable two-way radios, users are more likely to consume significant power from the battery. Many users working in the public safety arena, such as firefighters and police, rely on an uninterrupted power supply from the battery across a variety of environments, including drop, vibration, and water exposure. Interruption in power supply may occur due to weak physical and/or electrical connection between the battery and the communication device. When the battery is reconnected to the communication device, power is restored, but the device may need time to reboot and become fully operational again. Thus, electrical interfaces between the battery and the communication device face some of the toughest challenges to maintain a solid physical and electrical connection across the above said environments.

In tough environments, it would be beneficial to have reliable physical and electrical connection between the battery and the communication device. Prevention of water intrusion would be particularly beneficial. Accordingly, it would be desirable to have an improved battery interface assembly for a communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, a battery interface assembly for a portable communication device is provided herein that provides reliable electrical and physical contact over a variety of environments. The battery interface assembly is formed via a combination of elements on both the battery side and the portable communication device side in accordance with various embodiments of the invention. On the battery side, the battery includes a battery contact extension extending from a surface of the battery. The battery contact extension includes battery contacts and an o-ring coupled about the extension. On the communication device side, a printed circuit board (PCB) includes cantilevered contacts mounted thereto which are surrounded by a radio contact block encircled by a compressible seal. The communication device also includes a casting having an enclosure with first and second two apertures formed therein. Upon mounting the PCB to the casting, the compressible seal compressibly couples about a perimeter of one of the apertures such that the cantilevered contacts protrude through the aperture and into the enclosure. Upon sliding the battery into the communication device, the battery contact extension slides into the other aperture of the enclosure such that the battery contacts wipe over and mate with the cantilevered contacts of the PCB. The o-ring of the battery extension forms a radial seal about a perimeter of the other aperture. Thus, both radial and compressible sealing are provided to the battery interface assembly of the communication device.

Figure 1:
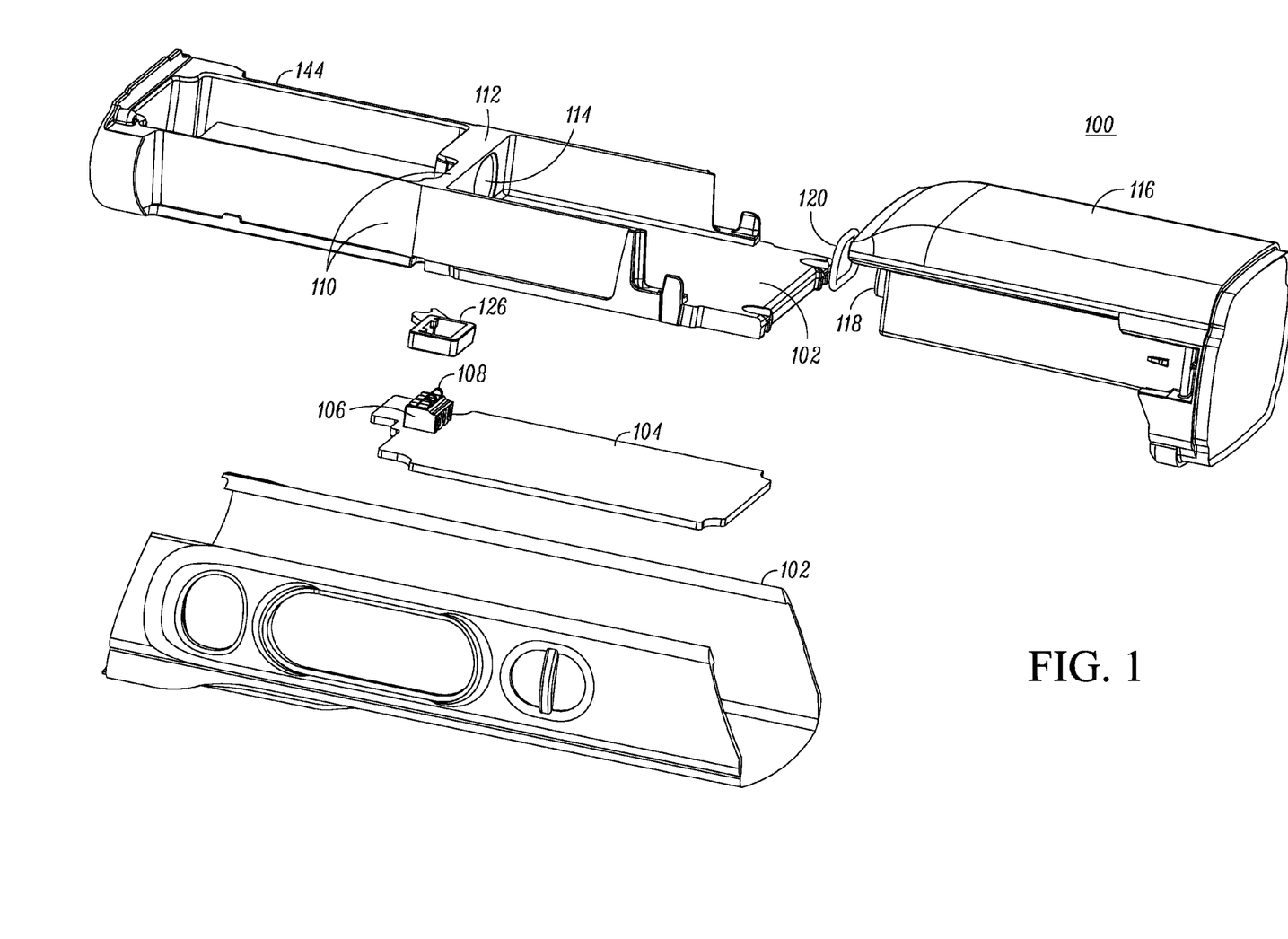
FIG. 1 illustrates an exploded view of a communication device with disassembled battery in accordance with an embodiment of the invention.
Figure 2:
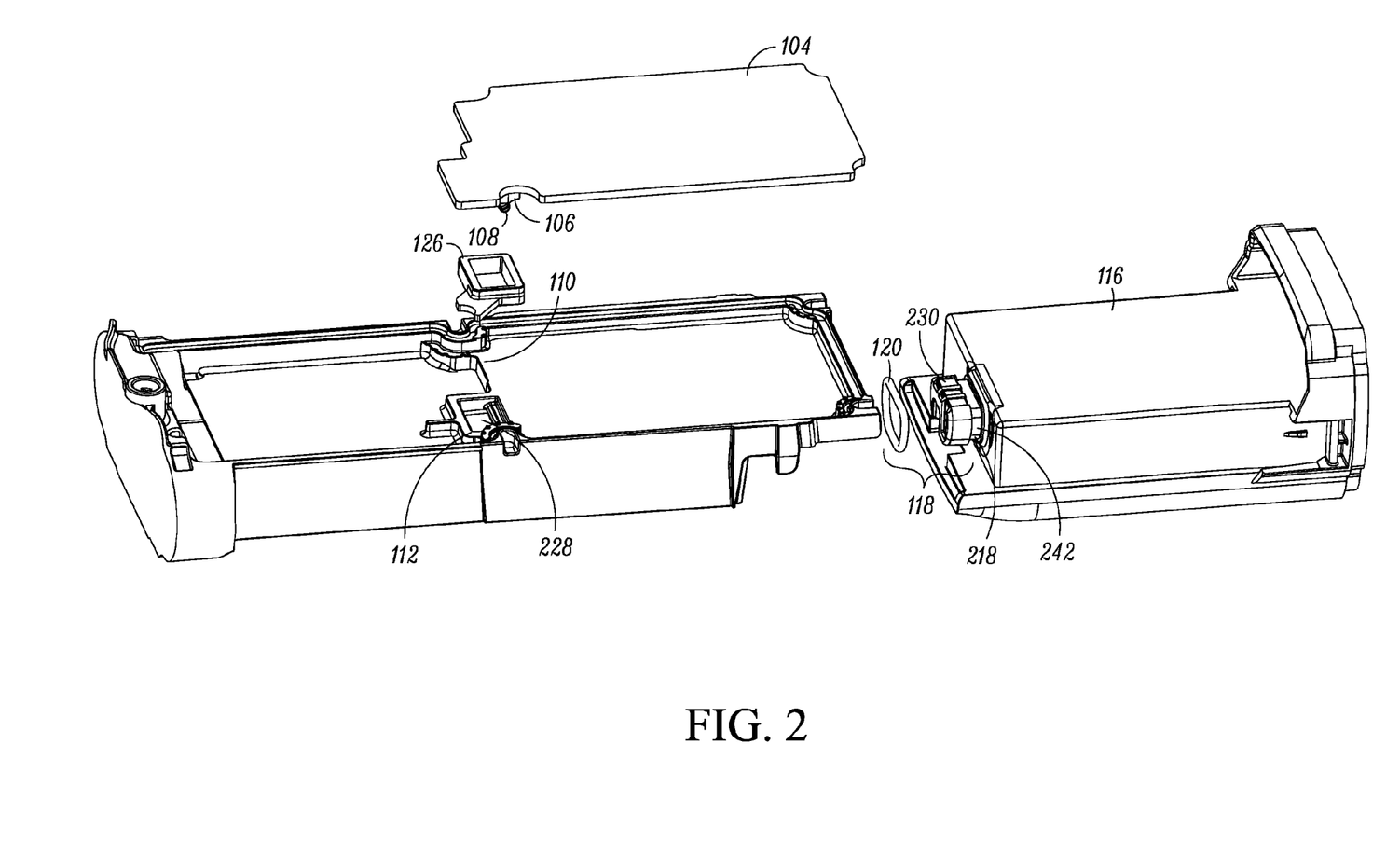
FIG. 2 illustrates portions of the exploded view of the communication device of FIG. 1, from another perspective.

FIGS. 1 and 2 illustrate two perspective exploded views of a communication device with disassembled battery in accordance with an embodiment of the invention. Communication device 100 can be a portable radio or other mobile communication device. Other handheld battery powered devices are also within the scope of this discussion and can benefit from the battery interface assembly formed in accordance with various embodiments of the invention.

Referring to FIGS. 1 and 2, communication device 100 includes housing 102, printed circuit board (PCB) 104, casting 110 and battery 116. The housing 102 can be formed in any suitable configuration to house or couple electrical and mechanical components, such as the PCB 104, casting 110 and battery 116. The PCB 104 includes a radio contact block 106 surrounding radio contacts 108, which are preferably cantilevered contacts. The battery 116 includes battery contacts 230. Casting 110 is preferably made of metal or other suitable material for supporting the elements housed within communication device 100. The casting 110 may provide, for example, heat sinking, alignment features and increased ruggedness to the communication device 100. In accordance with an embodiment of the invention, casting 110 includes an enclosure 112 for providing a point of contact between battery contacts 230 of the battery 116 and radio contacts 108 of the communication device 100. The enclosure 112 may also be referred to as a single cavity. The enclosure 112 has two apertures, a first aperture 228 and a second aperture 114. The first and second apertures 228, 114 may also be referred to as first and second recesses for the single cavity. In accordance with an embodiment of the invention, the first and second apertures 228, 114 are formed on different planes of the enclosure 112 that are orthogonal to each other. The second aperture 114 is on one plane or front surface of the enclosure 112 for receiving the battery contacts 230 of the battery 116 when the battery 116 is advanced into the housing 102. The first aperture 228 is another plane or bottom surface of the enclosure 112 for receiving the radio contact block 106 of the communication device 100.

In accordance with an embodiment, the radio contact block 106 is mounted on the PCB 104, or other suitable substrate, that can be positioned within the housing 102 of the communication device 100. The PCB board 104 may include any type of circuitry and may be of any shape and size that fits into the housing 102 of the communication device 100. A bottom surface of the radio contact block 106 is mounted on to a top surface of the PCB board 104 so as to surround cantilevered contacts 108.

The cantilevered contacts 108, which can be referred to as deflecting contacts, are shaped metal contacts mounted within a traditional plastic header for surface mount (SMT) soldering. These contacts load through the first aperture 228 of the communication device 100 mounting of the PCB 104 to the casting 110. The cantilevered contacts 108 mate with the battery contacts 230 when the battery 116 slides into the enclosure 112. The cantilevered contacts 108 may have spring action and may be pushed downwards when the battery contacts 230 wipe or rub over the cantilevered contacts 108 of the communication device 100.

In accordance with an embodiment of the invention, a compressible seal 126 is provided with which to surround the radio contact block 106. The compressible seal 126 is used to seal the radio contact block 106, mounted on the PCB 104, about a perimeter of the first aperture 228 in such a way that the cantilevered contacts 108 protrude into the first aperture 228 of the enclosure 112. In accordance with an embodiment of the invention, compressible sealing of the radio contact block 106 to the casting 110 occurs in response to the PCB 104 being mounted to the casting 110. The compressible seal 126 is preferably made of silicone or other material having sealing properties. The loading of the PCB 104 against the casting 110 compresses the seal and provides a strong physical support.

In accordance with an embodiment of the invention, the battery 116 includes battery contact extension 118 upon which are located battery contacts 230. In FIG. 2, the battery contact extension 118 is shown in more detail from a bottom view of the communication device 100. The battery contact extension 118 may include a base 242 and the battery contacts 230 mounted at a top end of the battery contact extension 118. The battery contacts 230 are preferably wiping contacts that perform a wiping or rubbing action over the cantilevered contacts 108 when the battery contact extension 118 slides into the enclosure 112 of the communication device 100. Such a wiping action removes contaminants present on the cantilevered contacts 108 improving the electrical connection between the battery contacts 230 and the cantilevered contacts 108 of the communication device 100. The battery contacts 230 include stamped nickel contacts of 0.13 mm thickness molded into the battery contacts extension 118. Also, the stamped nickel contacts include selective gold plating at a connection area where the battery contacts 230 mate with the cantilevered contacts 108 of the communication device 100.

In accordance with an embodiment, a groove 218 is formed about the base 242 of the battery contact extension 118 for coupling an o-ring 120 within the groove 218. The o-ring 120 is preferably formed of silicone or other similar material that provides radial sealing of the battery contact extension 118 about a perimeter of the second aperture 114 of the enclosure 112. In accordance with an embodiment of the invention, radial sealing of the battery contact extension 118 occurs in response to the top end of the battery contact extension 118 being slid into the second aperture 114 of the enclosure 112.

Figure 3:
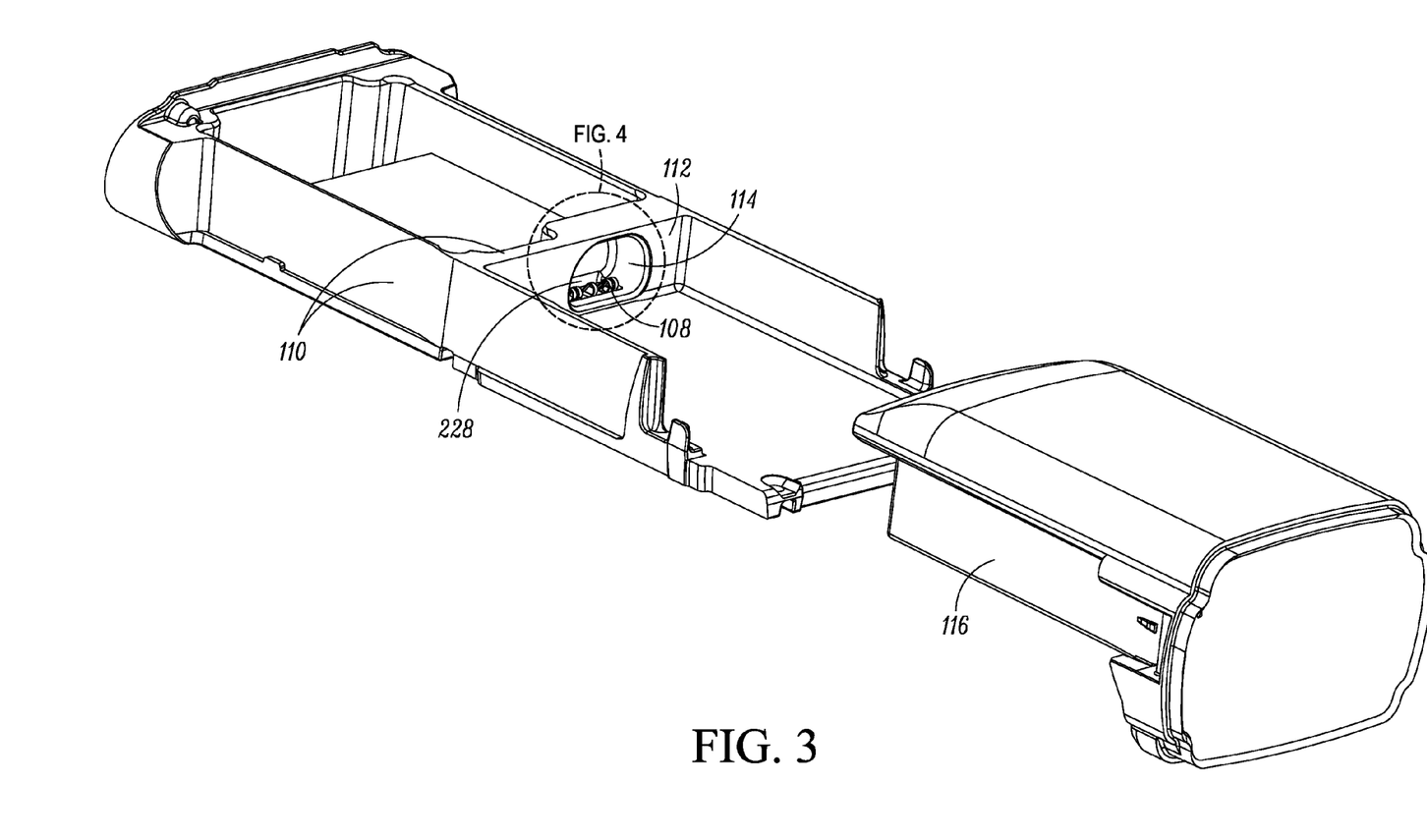
FIG. 3 illustrates a partially assembled view of the communication device of FIG. 1 in which the PCB board is mounted to the casting of the communication device.
Figure 4:
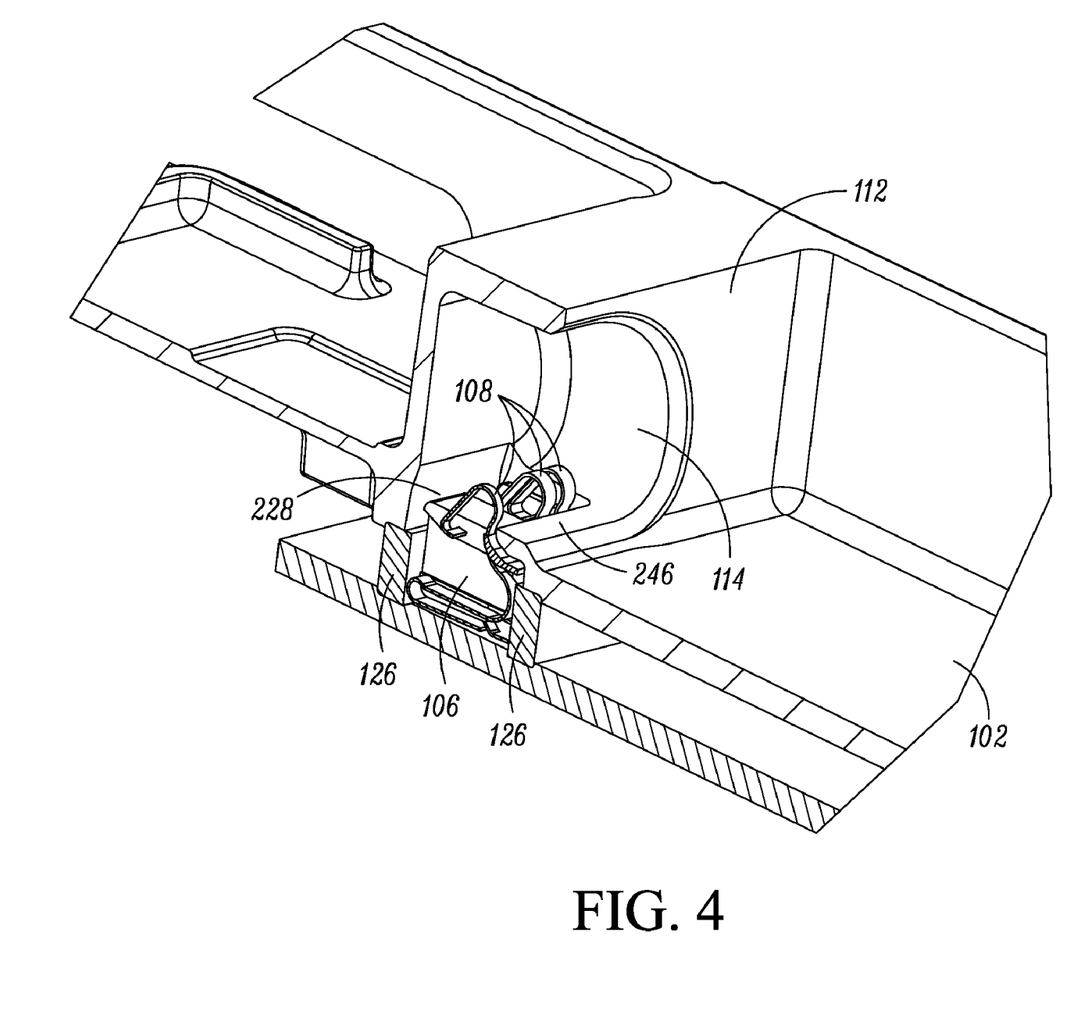
FIG. 4 illustrates a partial cutaway view of the casting of FIG. 3 having an enclosure formed in accordance with an embodiment of the invention.

FIG. 3 illustrates a partially assembled view of the communication device of FIG. 1 in which the PCB board is mounted to the casting of the communication device. FIG. 4 illustrates an enlarged partial cutaway view of the casting portion of FIG. 3 having an enclosure formed in accordance with an embodiment of the invention. Referring to FIGS. 3 and 4, casting 110 includes enclosure 112 having first aperture 228 and second aperture 114. The first aperture 228 is on the bottom surface of the enclosure that accepts the radio contact block 106 of the communication device 100. The radio contact block 106 is surrounded by the compressible seal 126 that seals the radio contact block 106 about the first aperture 228. With the PCB 104 mounted to the casting 110, compressible seal 126 compresses against the casting 110 such that the cantilevered contacts 108 protrude through the first aperture 228. The cantilevered contacts 108 protrude partially above a continuous smooth surface 246 around the periphery of the aperture 228 of the enclosure 112. The cantilevered contacts 108 are thus situated and ready to be pushed/deflected downwards reaching the same level as that of surface 246 when the battery 116 is fully advanced into the enclosure 112.

In accordance with an embodiment, the second aperture 114 is on a front surface of the enclosure 112 for receiving the battery contacts 230 of the battery contact extension 118 when the battery 116 is advanced into the housing 102. The front surface of enclosure 112 engages the base 242 of the battery contact extension 118 and also provides a surface for radial sealing the battery 116 inside the enclosure 112.

In one embodiment, the perimeter of the compressible seal 126 is more than or equal to the perimeter of the first aperture 228 for sealing the cantilevered contacts 108 about the perimeter of the first aperture 228 of the enclosure 112.

In accordance with an embodiment of the invention, the cantilevered contacts 108 mounted on the radio contact block 106 may have spring action and may be pushed downwards when the battery contacts 230 are advanced into the enclosure 112 of the communication device 100. Such a downward movement causes the cantilevered contacts 108 to mate with the battery contacts 230 making a flat contact surface in the enclosure 112.

As seen in FIG. 4, the cantilevered contacts 108 are firmly positioned inside the enclosure 112 by compressibly coupling/sealing the radio contact block 106 about the first perimeter 228 of the enclosure 112. The radio contact block 106 is surrounded by the compressible seal 126 that acts as a sealing component between the radio contact block 106 and the enclosure 112.

FIGS. 1-4 have shown the battery 116 and communication device 100 in disassembled views. The battery 116 may be assembled to the communication device by sliding the battery linearly in a single direction so that the battery 116 engages into the housing 102 and casting 110. Of course, depending upon the battery housing design, the direction of movement of the battery 116 may be in any directional manner, for example, from left to right or down or up. It is further understood that a variety of coupling features (e.g. latching mechanism, guide rails, etc.) may be used to engage the battery 116 into the housing 102 of the communication device 100. The battery interface assembly of the present invention focuses on the mating of the radio contacts 108 to the battery contacts 230 and the sealing of that mated connection.

Figure 5:
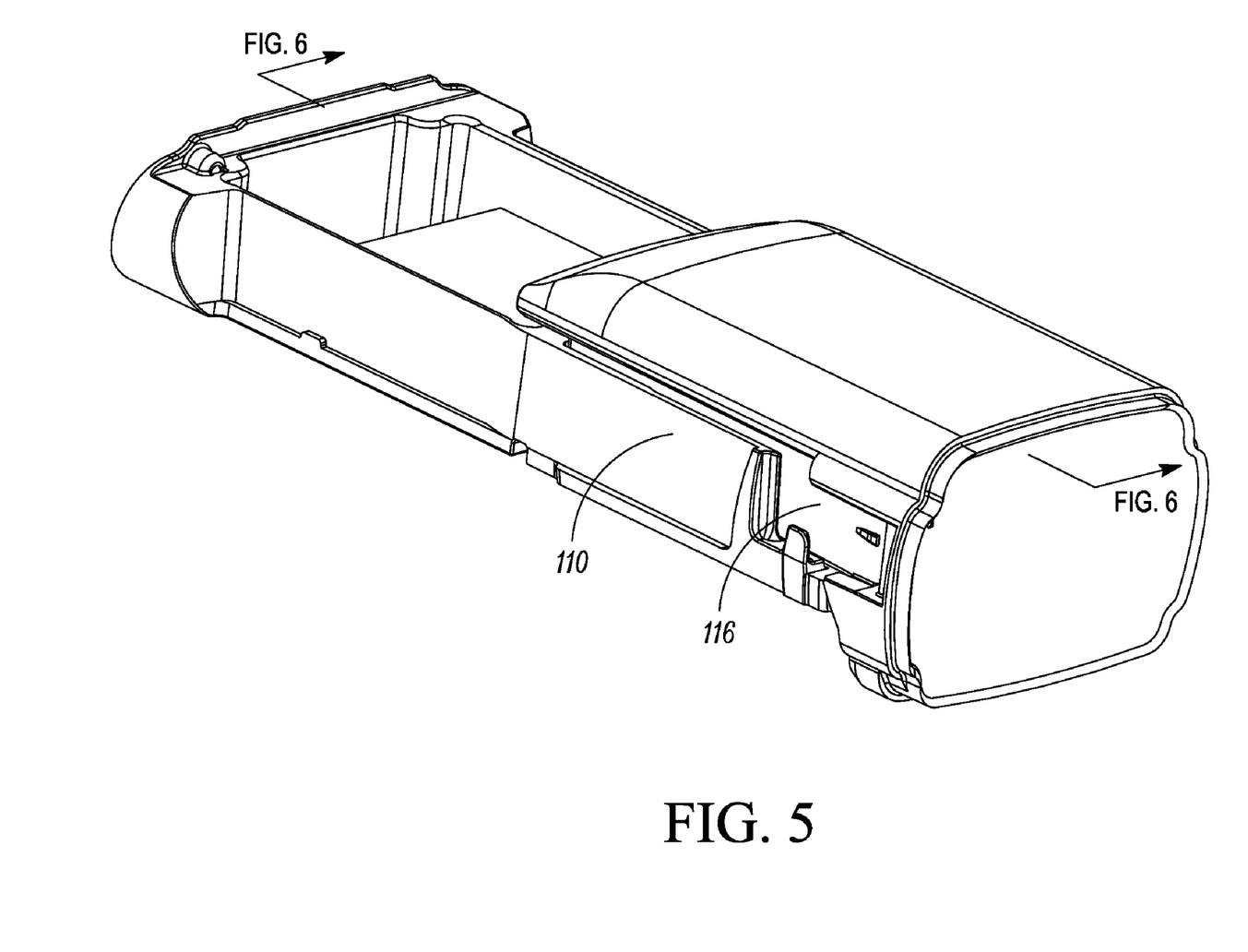
FIG. 5 illustrates a partially assembled view of the communication device with battery being assembled thereto in accordance with an embodiment of the invention.

Moving to FIG. 5 there is shown a partially assembled view of the communication device with battery assembled thereto in accordance with an embodiment of the invention. In FIG. 5, the battery 116 is engaged with the casting 110. At this point of assembly, the radio contact block 106 of PCB 104 is compressibly sealed to the casting 110 such that the cantilevered contacts 108 mate with the battery contacts 230.

In accordance with an embodiment of the invention, the battery 116 is advanced into the housing 102 in a linear direction such that the battery contact extension 118 mounted at the top end of the battery 116 slides into the second aperture 114 of the enclosure 112. The sliding movement of the battery contact extension 118 causes the battery contacts 230 to wipe or rub over the cantilevered contacts 108 of the communication device 100 removing contaminants present on the cantilevered contacts 108. As the battery 116 is fully advanced into the housing 102, the battery contact extension 118 slideably engages within the second aperture 114 of the enclosure 112 mating the battery contacts 230 with the cantilevered contacts 108 of the communication device 100. In addition, the radial seal component mounted on the groove 218 of the battery extension forms a radial seal about the perimeter of the second aperture 114 in response to the battery contact extension 118 being fully slid into the second aperture 114.

Figure 6:
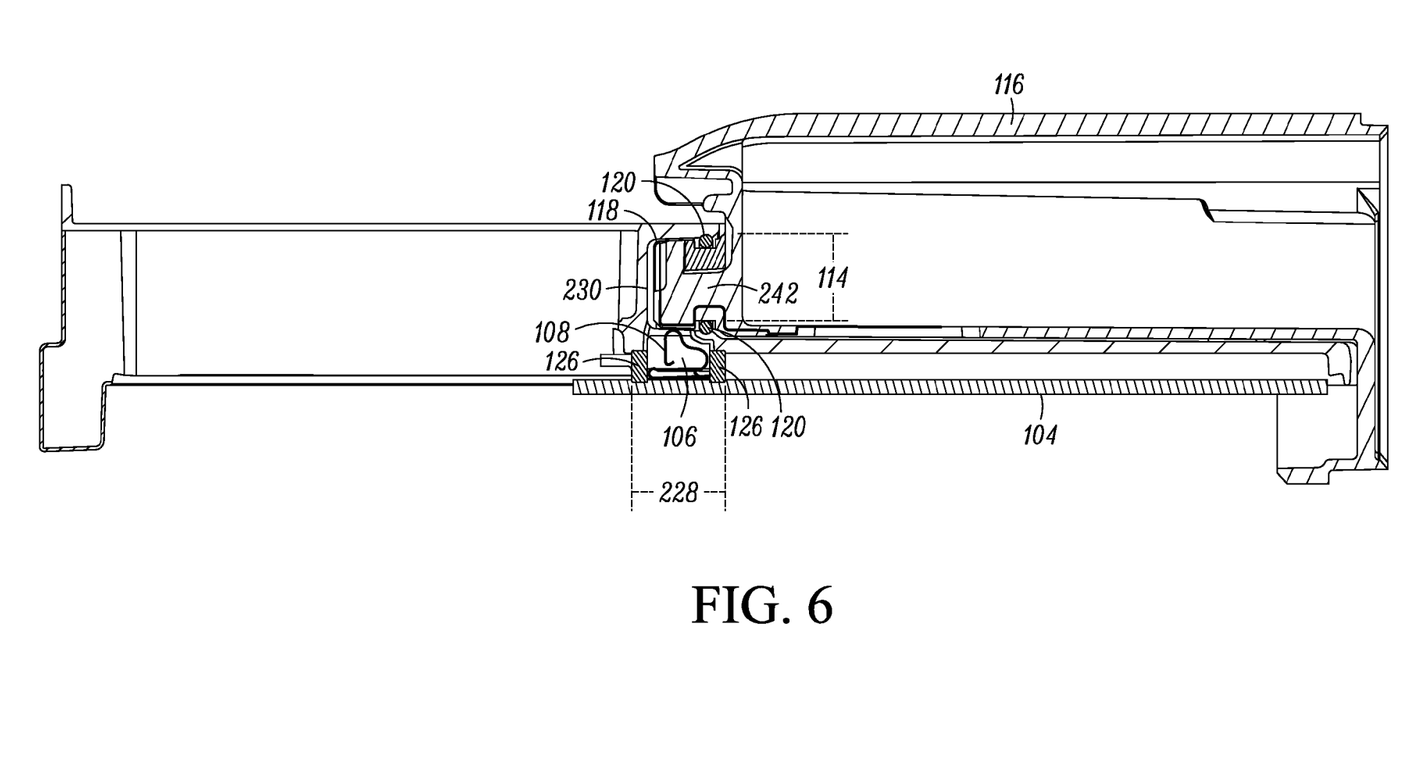
FIG. 6 illustrates a cross sectional side view of the communication device with battery assembled thereto of FIG. 5 in accordance with an embodiment of the invention.

FIG. 6 illustrates a cross sectional side view of the communication device with battery assembled thereto of FIG. 5 in accordance with an embodiment of the invention. As seen in this view, PCB 104 is mounted within the housing 102 of the communication device 100 such that the cantilevered contacts 108 within the radio contact block 106 protrude through the first aperture 228 of the enclosure 112.

The cross sectional view of the communication device 100 provides a detailed view of compressible sealing and radial sealing in the communication device 100. As seen in FIG. 6, the o-ring 120 mounted on the base 242 of the battery contact extension 118 seals the battery contact extension about the second aperture 114 of the enclosure 112. Similarly, the compressible seal component 126 mounted about the radio contact block 106 seals the cantilevered contacts 108 about the first aperture 228 of the enclosure 112. Apertures 114 and 228 are shown in phantom and moved off the figure in this view. Also, in FIG. 5, the battery contacts 230 are mated with the cantilevered contacts 108 forming a flat contact surface at a bottom surface of the battery contacts 230. The battery contacts 230 are thus firmly coupled to the cantilevered contacts 108 providing uninterrupted electrical and mechanical connection to the communication device 100.

Figure 7:
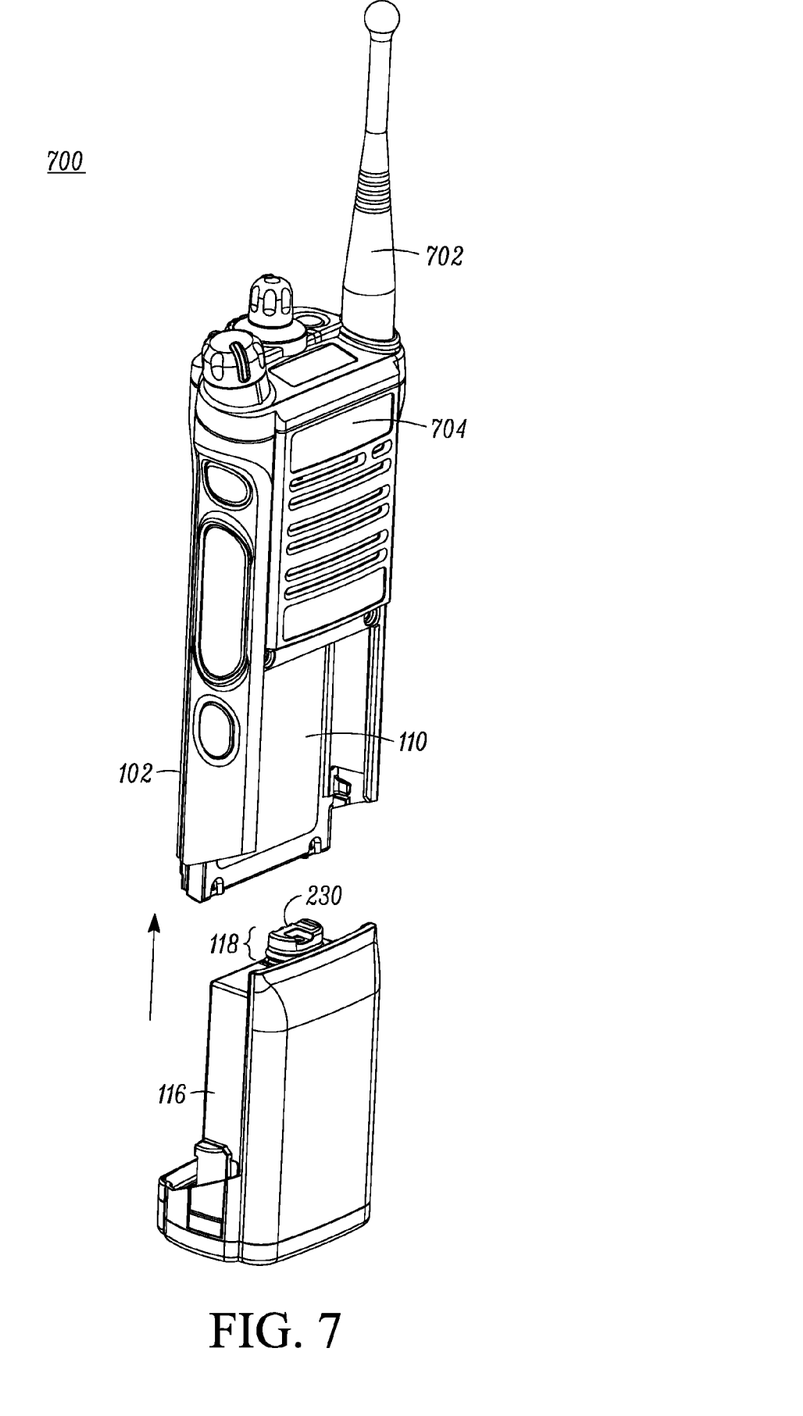
FIG. 7 illustrates another view of the communication device receiving the battery in accordance with an embodiment of the invention.

FIG. 7 illustrates another view of the communication device receiving the battery in accordance with an embodiment of the invention. In FIG. 7, the communication device 100 is segmented into two parts. The first part includes housing 102 and casting 110 formed in accordance with the embodiments of the invention, as well as other additional components for controlling the functions of the communication device 100, such as an antenna 702 and display 704. The second part includes battery 116 having battery contact extension 118 formed in accordance with the embodiments of the invention. Housing 102 and casting 110 engage the battery 116 as the battery is inserted into the communication device 100. In accordance with an embodiment of the invention, upon insertion of battery contact extension 118 within the enclosure of the casting 110, the battery contacts 230 mate with corresponding radio contacts within a compressibly and radially sealed environment as previously described.

Figure 8:
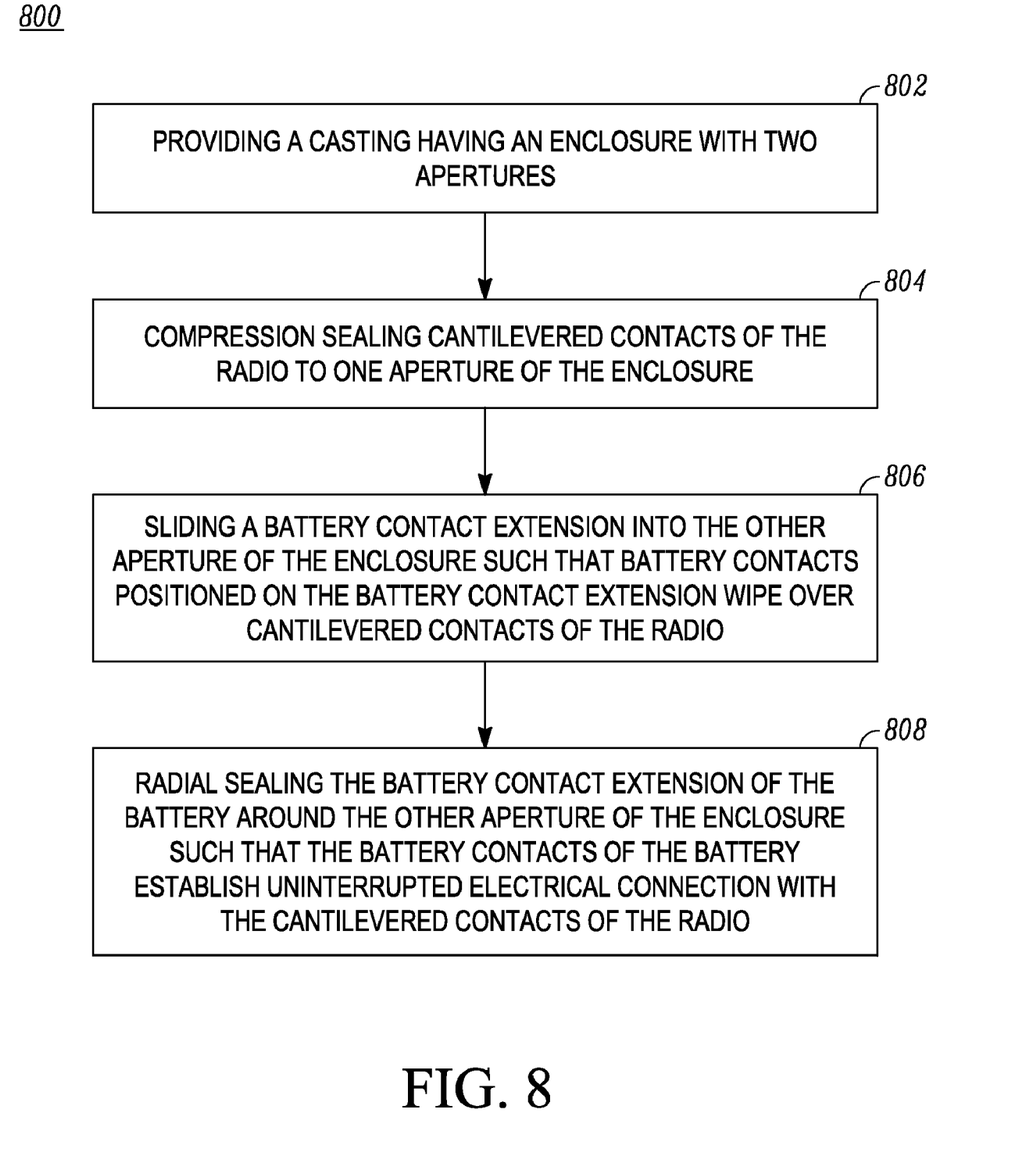
FIG. 8 is a flowchart of a method for assembling the battery to a radio in accordance with an embodiment of the invention.

FIG. 8 is a flowchart of a method for assembling the battery in a communication device in accordance with an embodiment of the invention. In this embodiment, the method is described from the perspective of a radio. The method starts with providing 802 a casting having an enclosure with two apertures in the radio. The two apertures are formed on two different planes of the enclosure that are at right angles to each other. The method continues with a step of compression sealing 804 cantilevered contacts of the radio to one aperture of the enclosure. The cantilevered contacts may be deflecting contacts loaded from an inside section of the enclosure.

The method then continues with a step of sliding 806 a battery contact extension into the other aperture of the enclosure such that battery contacts positioned on the battery contact extension wipe over cantilevered contacts of the radio. The battery contact extension is formed of a protrusion extending from the battery that is sized and shaped to fit into the enclosure of the casting. When the battery contact extension slides over the cantilevered contacts, the battery contacts wipe over cantilevered contacts pushing the cantilevered contacts downwards thereby providing a physical connection between the battery contacts and the cantilevered contacts.

The method then continues with a step of radial sealing 808 the battery contact extension of the battery around the other aperture of the enclosure such that the battery contacts of the battery establish uninterrupted electrical connection with the cantilevered contacts of the radio. The battery contact extension is sealed when the battery contact extension is fully advanced into the enclosure.

Thus, assembling the battery 116 employing the above said devices and method maintain a reliable physical and electrical connection between the battery contacts 230 and the cantilevered contacts 108 of the communication device 100. Also, the communication device 100 maintains a tight tolerance or interface across all environments such as contact bounce, contamination on the contacts, water intrusion, or plating wear in the communication device 100. The battery interface formed in accordance with the embodiments of the invention provides the advantage of both wiping contacts and radial sealing which in the past have been mutually exclusive.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication device, comprising:
   a housing;
   a printed circuit board (PCB) within the housing;
   a radio contact block having cantilevered contacts mounted to the PCB;
   a compressible seal surrounding the radio contact block;
   a casting having an enclosure formed therein the enclosure having first and second apertures, the compressible seal being compressibly coupled about a perimeter of the first aperture such that the cantilevered contacts protrude into the enclosure;
   a battery having a battery contact extension, the battery contact extension having battery contacts mounted at a top end and an o-ring coupled to a base; and
   the battery contact extension making contact between the battery contacts and the cantilevered contacts while the o-ring forms a radial seal about a perimeter of the second aperture.

2. The communication device of claim 1, wherein the battery contacts are wiping contacts.

3. The communication device of claim 1, wherein the battery contacts comprise stamped nickel contacts molded into the battery contacts extension.

4. The communication device of claim 3, wherein the stamped nickel contacts include selective gold plating at a connection area of the battery contacts.

5. The communication device of claim 1, wherein the o-ring and compression seal are made of silicone material.

6. The communication device of claim 1, wherein the first aperture is on a first plane of the casting and the second aperture is on a second plane of the casting.

7. The communication device of claim 1, wherein the battery contact extension has a groove formed about the base, the o-ring being coupled within the groove.

8. The communication device of claim 1, wherein the contact made between the battery contacts and the cantilevered contacts and the o-ring forming the radial seal about the perimeter of the second aperture occur in response to the top end of the battery contact extension being slid into the second aperture.

9. The communication device of claim 1, wherein the compressible seal is compressibly coupled to the perimeter of the first aperture in response to the casting and PCB being mounted within the housing.

10. A communication device, comprising:
    a radio having radio contacts;
    a battery having battery contacts;
    a casting having first and second recesses formed at right angles to each other and opening into a single cavity, the single cavity for receiving the radio contacts and the battery contacts through the first and second recesses; and
    first and second sealing components, the first sealing component forming a compression seal about the first recess and the second sealing component forming a radial seal about the second recess thereby sealing the radio contacts and battery contacts within the single cavity of the casting.

11. The communication device of claim 10, wherein the radio contacts comprise cantilevered radio contacts.

12. The communication device of claim 11, wherein the cantilevered radio contacts are surrounded by a contact block and mounted to a printed circuit board.

13. The communication device of claim 12, wherein the cantilevered radio contacts protrude through the first recess into the single cavity.

14. The communication device of claim 11, wherein the first sealing component comprises a compression seal mounted about the contact block.

15. The communication device of claim 14, wherein the second sealing component comprises an o-ring.

16. The communication device of claim 15, wherein the battery contacts are wiping contacts.

17. The communication device of claim 16, wherein the wiping contacts are formed on a battery contact extension extending from one end of the battery, the battery feature slideably engaged within the second recess of the single cavity so as to mate the wiping contacts to the cantilevered radio contacts.

18. The communication device of claim 10, wherein the battery contacts are formed on a battery contact extension extending from one end of the battery, the battery contact extension slideably engaged within the second recess of the single cavity so as to mate the battery contacts with the radio contacts.

19. A method for assembling a battery in a radio, the method comprising:
    providing a casting having an enclosure with two apertures;
    compression sealing cantilevered contacts of the radio to one aperture of the enclosure;
    sliding a battery contact extension into the other aperture of the enclosure such that battery contacts positioned on the battery contact extension wipe over cantilevered contacts of the radio; and radial sealing the battery contact extension of the battery around the other aperture of the enclosure such that the battery contacts of the battery establish uninterrupted electrical connection with the cantilevered contacts of the radio.

20. The method of claim 19, wherein the battery contact extension is formed of a protrusion extending from the battery that is sized and shaped to fit into the enclosure of the casting.

21. The method of claim 19, wherein the battery contacts wipe over cantilevered contacts pushing the cantilevered contacts downwards thereby providing a physical connection between the battery contacts and the cantilevered contacts.

22. The method of claim 19, wherein radial sealing the battery contact extension of the battery comprises radial sealing the battery contact extension of the battery when the battery contact extension is fully advanced into the enclosure.

23. The method of claim 19, wherein radial sealing the battery contact extension of the battery around the other aperture of the enclosure comprises sealing about the other aperture with an o-ring mounted about a base of the battery contact extension.

24. The method of claim 19, wherein the cantilevered contacts are deflecting contacts loaded from an inside section of the enclosure.

25. A battery interface assembly for a portable radio, comprising:
   a battery having battery contacts;
   a radio having radio contacts for mating with the battery contacts;
   a casting having a cavity with two apertures formed therein, the two apertures opening into the cavity to provide a point of contact for mating the radio contacts to the battery contacts; a compression seal encircling the radio contacts, the compressible seal compressibly coupled to the casting such that the radio contacts protrude through one of the two apertures; and
   a radial seal surrounding the battery contacts when the battery contacts are mounted within the other aperture of the two apertures.

* * * * *